United States Patent Office 3,449,056
Patented June 10, 1969

---

3,449,056
DYEING HUMAN HAIR WITH 1-AZAANTHRAQUINONES
Franz Pum, Stamford, Conn., assignor to Clairol Incorporated, New York, N.Y., a corporation of Delaware
No Drawing. Filed May 12, 1966, Ser. No. 549,466
Int. Cl. A61k 7/12; C07d 33/52
U.S. Cl. 8—10.1                                8 Claims

ABSTRACT OF THE DISCLOSURE

The invention relates to a method for dyeing human hair and keratinaceous fibers with dyes of the 1-azoanthraquinone series, especially the 5,8-bis(alkylamino)-1-azaanthraquinone compounds.

---

This invention relates to a new series of dyes of the 1-azaanthraquinone series and to their use in dyeing keratinaceous fibers and especially human hair. More particularly the dyes of this invention can be described by the formula:

(I)

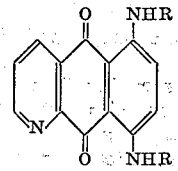

wherein R is hydrogen, alkyl, hydroxyalkyl, aminoalkyl, alkoxyalkyl, aryl or aralkyl. In a preferred form of this invention, R is hydrogen, lower alkyl or lower hydroxyalkyl, having 1 to 4 carbon atoms inclusive and from 1 to 3 hydroxy groups. Similarly, in the case where R is alkoxyalkyl or aminoalkyl, the alkyl portions of these groups are preferably lower alkyl, e.g., having from 1 to 4 carbon atoms. The aminoalkyl group can further be defined as an alkyl group having as a substituent —$NR_1R_2$ wherein $R_1$ and $R_2$ are the same or different and are hydrogen, lower alkyl, lower hydroxyalkyl (including the case where $R_1$ and $R_2$ are both part of the same heterocyclic ring, such as morpholine, piperidine, and piperazine).

These compounds are useful as dyes for a variety of fibers, such as polyamide, polyester, and cellulose ester fibers. Moreover, compounds of this invention are particularly useful as direct dyes for keratinaceous fibers, e.g., human hair, and may be applied at ambient temperatures. This is a decided advantage since direct dyes for hair which can be applied in this fashion are not known to any great extent. Moreover, their affinity for human natural or bleached hair is considerably greater than the affinity of the corresponding compounds in the anthraquinone series.

The dyes of the present invention, and especially the 5,8-bis(alkylamino)-1-azaanthraquinone compounds, dye hair a deep blue color which appears in incandescent light to turn a slightly green-blue. In contrast to this the corresponding 1,4-bis(alkylamino)anthraquinones change to a redder shade of blue in going from daylight to incandescent light. This red shift is highly objectionable since it throws off the shade of the dye blends in which it would be used for its blue color. In comparison the shade shift, mentioned above, for azaanthraquinones is only a slight one and affects the shade of dye blends as viewed under incandescent light only slightly. The shift is toward the green, which is pleasing and not objectionable, since it involves no sacrifice of blueness as in the case of a red shift.

An additional advantage of the azaanthraquinones over anthraquinones is the greater solubility of the former. Moreover, the azaanthraquinones are characterized by their fastness to shampooing. Furthermore, the dye compositions containing azaanthraquinones are stable to storage when held at 50° C. for as long as three months.

The principal starting material used in the preparation of the compounds of the present invention is 5,8-dihydroxy-1-azaanthraquinone (i.e., 1-azaquinizarin). This can be prepared by following the procedure of Raudnitz (Ber. 62, 507) or Niementowski et al. (Roczniki, Chem. 7, 218; Chem Zent. 1928I, 2091; Chem. Abstr. 22, 2167 [1928]).

The compounds of this invention are prepared by reacting the 1-azaquinizarin with ammonia or the appropriate primary amine. Some or all of the 1-azaquinizarin may be in the leuco form and boric acid may be present to assist in the condensation. One effective procedure is to dissolve the 1-azaquinizarin in alcohol or aqueous alcohol and react it with ammonia or the amine in the presence of hydrosulfite (sodium dithionite) and sodium carbonate at elevated temperatures for several hours. The reaction mixture is then diluted with water, and the leuco form of the compounds of Formula I above are oxidized by means of air. The reaction product is separated by filtration or extraction with a suitable solvent.

Any of a variety of amines may be used in the above described process in preparing the compounds of the present invention. By way of illustration the following specific compounds may be mentioned: methylamine, ethylamine, n-propylamine, isopropylamine, n-butylamine, iso-butylamine, 2-hydroxyethylamine, 3-hydroxypropylamine; 2,3-dihydroxypropylamine; 2-methyl-1,3-dihydroxy-2-propylamine; trishydroxymethylmethylamine; 1,3-propanediamine; 1,6-hexanediamine; 3-methylaminopropylamine; 2-dimethylaminoethylamine; 2-(2-hydroxyethylamino)-ethylamine; 2-N-piperidinoethylamine; 3-N-morpholinopropylamine; diethylenetriamine; triethylenetetramine; 2,2'-iminodipropylamine; 3,3'-iminodipropylamine; 2-ethoxyethylamine; 2-methoxyethylamine; 3-ethoxypropylamine; benzylamine, p-methoxybenzylamine, p-hydroxybenzylamine, phenylethylamine, p-hydroxyphenylethylamine; p-methoxyphenylethylamine, aniline, p-toluidine, m-toluidine, o-toluidine, p-dimethylaminoaniline, p-(2-hydroxyethylamino)aniline, p-(bis-2-hydroxyethylamino)aniline, p-aminophenol, m-aminophenol, p-ethylaniline, p-chloroaniline, m-fluoroaniline, p-anisidine, m-anisidine, p-phenetidine, and 3-dimethylaminopropylamine.

The temperature at which the 1-azaquinizarin will be condensed with the amine or ammonia will vary depending upon the reactants employed and the reaction medium. In general, however, the reaction will be carried out at the reflux temperature which will be in the range of from about 50° to 200° C. Similarly, the molar proportions of reactants can be varied considerably. In the typical cases from about 3 moles to 50 moles of amine or ammonia will be used per mole of 1-azaquinizarin. The time of reaction may vary from about 1 hour for an aliphatic amine to about 36 hours for an aromatic amine.

The condensation process of the present invention is preferably carried out in the presence of a solvent in which the organic reactants are soluble and which may also contain water, the solvent being miscible therein. Typical solvents for this purpose include: methanol, ethanol, n-propanol, isopropanol, dioxane, tetrahydrofuran. In some cases the excess of amine may serve as the solvent.

In one form of this invention the 1-azaquinizarin is partially reduced before it is reacted with the amine. A variety of reducing agents can be used for this purpose, such as sodium hydrosulfite, sodium bisulfite, sulfur dioxide, stannous chloride and zinc in acid; catalytic hydrogenation may also be employed.

When ammonia is a reactant, in the preparation of 5,8-diamino-1-azaanthraquinone, the above procedures may also be used with the substitution of ammonia for the amine. However, it is preferable to perform the reaction using liquid ammonia in an autoclave at the above temperature, range and times; it is advisable to have present some organic solvent, such as ethanol, in order to dissolve the 1-azaquinizarin.

The dyes of the present invention can be employed to prepare basic, neutral or acidic dye compositions. Furthermore, they may likewise be included in hair dyeing compositions which contain other direct dyeing dyes. A variety of direct dyeing dyes are known in the prior art which are useful for this purpose. They include nitro dyes, azo dyes, anthraquinone dyes, etc. By way of illustration, any of the nitro dyes disclosed in the following U.S. patents may be used in conjunction with the present dyes: 2,750,326; 2,750,327; 3,088,877; 3,088,878 and 3,088,978.

The pH of the dye compositions of this invention can vary from about 2.5 to 10. Any selected water-dispersible, compatible, alkalizing agent (if it is desired to have the compositions in the alkaline range) can be used to give the desired pH. The quantity of the alkalizing agent employed can vary over a wide range depending on the dye and particular alkalizing agent employed and the desired pH. Illustratively, the alkalizing agent can vary from less than about 0.1% to about 10%, and preferably from about 0.25% to about 5% by weight of the composition.

Any of a wide variety of alkalizing agents can be used to adjust the pH of the dyeing composition on the basic side. Ammonium hydroxide, because of its freedom from toxicity over a wide concentration range and its economy, is an acceptable alkalizing agent. However, there can be used in place of, or together with, ammonia any other compatible ammonia derivative as an alkalizing agent, such as an alkylamine, such as ethylamine, dipropylamine, or triethylamine; an alkanediamine, such as 1,3-diaminopropane; an alkanolamine, such as ethanolamine or diethanolamine; a polyalkylene polyamine, such as diethylenetriamine; or a heterocyclic amine, such as morpholine.

The pH of the composition may be adjusted on the acid side with any inorganic or organic acid or acid salt which is compatible with the composition and will not introduce toxicity under its conditions of use, especially when acid compositions are desired. Illustrative of acids or acid salts there can be mentioned: sulfuric, formic, acetic, lactic, citric or tartaric acid, or ammonium sulfate, sodium dihydrogen phosphate or potassium bisulfate.

Water-soluble surface active agents can also be employed in the dyeing compositions utilized in this invention. These can be anionic, non-ionic or cationic. Illustrative of the various types of water-soluble surface active agents there can be mentioned: higher alkylbenzenesulfonates; alkylnaphthalenesulfonates; sulfonated esters of alcohols and polybasic acids; taurates; fatty alcohol sulfates; sulfates of branched-chain or secondary alcohols; alkyl dimethylbenzyl ammonium chlorides; and the like. Illustrative of specific surfactants there can be mentioned: lauryl sulfate; polyoxyethylene lauryl ester; myristyl sulfate; glyceryl monostearate; sodium salt of palmitic methyl taurine; cetyl pyridinium chloride; lauryl sulfonate; myristyl sulfonate; lauric diethanolamide; polyoxyethylene stearate; stearyl dimethyl benzyl ammonium chloride; dodecyl benzene sodium sulfonate; nonyl naphthalene sodium sulfonate; dioctyl sodium sulfosuccinate; sodium N-methyl-N-oleoyl taurate; oleic acid ester of sodium isothionate; sodium dodecyl sulfate; the sodium salt of 3,9-diethyl tridecanol-6-sulfate and the like. The quantity of water-soluble surface active agent can vary over a wide range, such as that of from about 0.25% to 15% and preferably from about 0.25% to 10% by weight of the composition.

A thickening agent can also be incorporated in the present dyeing composition which may be one or several of those commonly used in hair dyeing, such as sodium alginate or gum arabic, or cellulose derivatives, such as methylcellulose, hydroxyethyl-cellulose, or the sodium salt of carboxymethylcellulose, or acrylic polymers, such as polyacrylic acid sodium salt, or inorganic thickeners, such as bentonite. The quantity of thickening agent can vary over a wide range, such as that of from about 0.1% to 20% and preferably from about 0.5% to 5% by weight.

The tinctorially effective quantities of the novel 1-azaanthraquinone dyes in the compositions of this invention can also vary over a wide range, such as that of about 0.01% to greater than about 5%, e.g., 10%, by weight of the composition, and preferably from about 0.01% to about 2% by weight. The water content of the composition is ordinarily the major constituent and can vary over a wide range dependent in large measure on the quantity of other additives. Thus, the water content can be as little as 10%, and preferably from about 70% to 99%.

The dyeing compositions of this invention are preferably aqueous compositions. The term "aqueous composition" is used herein in its usual generic sense as embracing any water-containing composition embodied in the invention. This includes true solutions or mixtures of the dye in an aqueous medium, either alone or in conjunction with other materials, which are also dissolved or dispersed in the aqueous medium. The dye may be colloidally dispersed in the medium or may merely be intimately mixed therein.

The term "aqueous medium" as used herein, includes any medium which contains water. Thus, the aqueous medium may be an aqueous alkaline, aqueous neutral or aqueous acid medium. Moreover, the aqueous medium may comprise water and a solvent, e.g., ethanol. The latter may be employed as a common solvent to enhance the solution of the dye or some other organic material.

The aqueous compositions of this invention may take many forms. Thus, they may be thin or thick flowable liquids, pastes, gels, etc.

Typical dyeing compositions of the various classes described above are set forth below:

(1) ALKALINE COMPOSITIONS

|  | General range, percent | Preferred range, percent |
| --- | --- | --- |
| Dye | 0.01–5 | 0.01–2 |
| Surface active agent | 0.25–10 | 0.25–5 |
| Alkali | 0.1–10 | 0.25–5 |
| Thickening agent | 0.1–20 | 0.5–3 |
| Acid added to pH | 7–11 | 7.5–10.5 |
| Water to 100%. | | |

Any of the dyes, surface active agents, alkalies, thickening agents, acids and combinations thereof set forth above may be used in the proportions specified in the table immediately above.

(2) ACID COMPOSITIONS

The acid compositions are similar to the above alkaline compositions, except that the alkali is omitted, and the acid is added to a pH of 2.5–6.8. The surfactant may be anionic, cationic, or non-ionic or suitable mixtures of these, and any of these mentioned above may be used. The choice of thickener is somewhat more limited, to alkylcellulosics, such as methylcellulose and inorganics. In certain cases the surfactant, itself, acts as a thickener.

The dyeing compositions of this invention can be prepared by the conventional methods used in the hair dyeing art. Thus, they can be prepared by dissolving or suspending the dye in water in the desired concentration. Water miscible organic solvents can be employed to facilitate solution of the dye; in this event, the dye can be dissolved first in the solvent and then diluted with water. The dispersion of the various ingredients can also be facilitated by heating the composition at temperatures varying from 40° C. to 110° C., either before dilution with water or afterwards.

The dyeing compositions of this invention can be applied to hair by the conventional techniques used in the art. Illustratively, when applied to living hair on the human head, the compositions can be applied to the hair with a brush, sponge, or other means of contact, such as dipping until the hair is properly saturated with the composition.

The reaction time or time of contact of the dyeing composition with the hair is not critical and can vary over a wide range used in the hair dyeing art, such as periods of about 5 minutes to about 2 hours, and preferably from about 10 minutes to about 60 minutes. The dyeing temperature can vary over wide limits as is conventional in the art. Thus, the dyeing temperature can vary from about 30° C. to about above 50° C.

The following examples are further illustrative of the present invention. It should be understood, however, that this invention is not limited thereto.

Example 1.—5,8-bis(methylamino)-1-azaanthraquinone

A solution of 2.5 g. (0.01 mole) of 1-azaquinizarin (i.e., 5,8-dihydroxy-1-azaanthraquinone) in 150 ml. of ethanol was heated to reflux and partially reduced by addition of 0.5 g. $Na_2CO_3$ and 1.5 g. $Na_2S_2O_4$. To this was added 40 ml. of a 40% aqueous methylamine solution in four 10 ml. portions at 15 minute intervals, and boiling under reflux was continued for another 15 minutes. The solution was allowed to cool and air was passed through in order to oxidize the leuco form of the product to the oxo form. After dilution with water the product was extracted with chloroform. The chloroform solution was dried over magnesium sulfate, and the solvent removed by evaporation in vacuum. Yield of blue dye 2.3 g. (71.7%); M.P. 217–219° C. The product dyed cellulose acetate and nylon fibers in blue shades.

Example 2.—5,8-bis(propylamino)-1-azaanthraquinone

A solution of 2.5 g. (0.01 mole) of 1-azaquinizarin in 300 ml. of methanol was heated at reflux with stirring, and a mixture of 0.5 g. $Na_2CO_3$ and 1.5 g. $Na_2S_2O_4$ was added. After 5 minutes 40 ml. (29 g.) n-propylamine was added in 4 portions at one-hour intervals. After the addition was completed, stirring was continued for another hour, the heat source removed and the reaction mixture allowed to cool to 30°–35° C. On addition of 1200 ml. of water an oil separated. Air was passed through in order to complete the oxidation of the leuco product, and after 18 hours a solid separated which was filtered off and dried. Yield 3.0 g. = 77%; M.P. 82–83° C. The dye gave greenish blue shades on cellulose acetate and nylon fibers.

Example 3.—5,8-dianilino-1-azaanthraquinone

A solution of 2.5 g. (0.01 mole) of 1-azaquinizarin in 300 ml. of methanol was heated to reflux with stirring and a mixture of 0.5 g. $Na_2CO_3$ and 1.5 g. $Na_2S_2O_4$ was added. After 5 minutes 27 g. of aniline was added and refluxing and stirring continued for 24 hours. The reaction mixture was cooled, 500 ml. water was added, and air was passed through in order to oxidize the leuco product to the oxo form. The excess of aniline was neutralized by means of 10% hydrochloric acid, and the greenish blue product filtered off and dried in vacuum. It dyed wool a greenish blue shade from an acid bath.

Example 4.—5,8-bis(benzylamino)-1-azaanthraquinone

The process of Example 3 was followed, excepting that in place of aniline, benzylamine was employed.

Example 5.—5,8-bis(2-hydroxyethylamino)-1-azaanthraquinone

A solution of 2.5 g. (0.01 mole) of 1-azaquinizarin in 300 ml. of methanol was brought to a boil at reflux with stirring, and a mixture of 0.5 g. $Na_2CO_3$ and 1.5 g. $Na_2S_2O_4$ was added. After 5 minutes 10 ml. of monoethanolamine was added, and the mixture refluxed for 8 hours. After cooling to room temperature, 3 ml. of 10% sodium hydroxide was added, and the reoxidation of the leuco compound achieved by means of an air stream passed through the reaction mixture. The precipitate formed was filtered off and washed with water and ethanol. Yield 2.7 g. = 79%; M.P. 240–241° C.

Example 6.—5,8-diamino-1-azaanthraquinone 2.5 g. (0.01 mole) 1-azaquinizarin was dissolved in 15 ml. of ethanol and 2 ml. of water. The solution was placed in an autoclave, and 25 ml. of liquid ammonia added and the mixture heated for 3 hours at 100° C. After cooling most of the $NH_3$ was allowed to evaporate, the reaction mixture made acidic with 10% hydrochloric acid, and unreacted starting material removed by means of methylene chloride extraction. The water layer was made alkaline with 20% NaOH solution, and the diamino compound having the above named structure was extracted with methylene chloride. The product recovered from the solvent was chromatographically pure (as developed on silica gel with 5% chloroform in methanol). It did not melt at temperatures up to 350° C. The shade on hair and cellulose acetate fiber was reddish blue. Its infrared spectrum showed the presence of primary amino groups (double peak at 3320 and 3440 cm.$^{-1}$), and the absence of the broad hydroxylic absorption at 3500 cm.$^{-1}$ observed for 1-azaquinizarin.

Example 7.—5,8-bis(3 - dimethylaminopropylamino) - 1 - azaanthraquinone

A solution of 2.5 g. (0.01 mole) of 1-azaquinizarin in 200 ml. of methanol was heated at reflux with stirring, and a mixture of 0.5 g. $Na_2CO_3$ and 1.5 g. $Na_2S_2O_4$ was added. Then at the boil, 50 g. of N,N-dimethyl-1,3-propanediamine was added and heating at reflux continued for five hours. After cooling, 1000 ml. of water was added and air passed through the reaction mixture in order to oxidize the leuco form of the product to the oxo form. The reaction mixture was extracted with methylene chloride and the solvent evaporated off. Unreacted starting amine was distilled off under reduced pressure. The blue product was washed with 5% brine in order to remove the last traces of amine. It dyed cellulose acetate fiber and nylon in greenish blue shades.

Example 8.—5,8 - bis[3 - (3 - aminopropylamino)propylamino]-1-azaanthraquinone

A solution of 2.5 g. (0.01 mole) of 1-azaquinizarin in 300 ml. of methanol was heated at reflux, and a mixture of 0.5 g. $Na_2CO_3$ and 1.5 g. $Na_2S_2O_4$ was added. After 5 minutes, 29 g. of 3,3′-imino-bis-propylamine was added and refluxing continued for 5 hours. The reaction mixture was cooled by adding 1000 ml. of cold water, and air was passed through in order to oxidize the leuco form of the product. Precipitation of the product was completed by adding salt. After filtration the blue precipitate was washed with 5% brine and a little water and dried. It dyed acetate goods a greenish blue shade.

Example 9.—5,8 - bis(2-ethoxyethylamino) - 1 - azaanthraquinone

A solution of 2.5 g. (0.01 mole) of 1-azaquinizarin was dissolved in 300 ml. of methanol and heated at reflux with stirring. 0.5 g. $Na_2CO_3$ and 1.5 g. $Na_2S_2O_4$ was added and after 5 minutes, 32 g. of 2-ethoxyethylamine was added and refluxing continued for 5 hours. The reaction mixture was cooled by addition of 1000 ml. of water. Thereafter oxidation of the leuco form was accomplished by passing air through the mixture. Dilute hydrochloric acid was added to Congo Red acidity, and the product was extracted by means of methylene chloride. The product was recovered as a blue powder by evaporating off the solvent. It dyed nylon and acetate fibers a greenish blue shade.

Example 10

A composition for dyeing hair was prepared by mixing the following ingredients at room temperature:

| | |
|---|---|
| 5,8 - bis(2 - hydroxyethylamino) - 1 azaanthraquinone _____g__ | 0.25 |
| Ethanol _____g__ | 2.00 |
| Nonylphenoxy(polyethyleneoxy)ethanol _____g__ | 1.00 |
| Methylcellulose _____g__ | 2.00 |
| Water up to _____ml__ | 100 |
| Citric acid to pH 3 ca. _____g__ | 0.25 |

The composition was poured over human natural gray or bleached hair and left in contact for 20 minutes at 38°. The hair was dyed a greenish blue shade which was fast to shampooing.

Example 11

A dyeing composition was prepared the following way:

| | |
|---|---|
| 5,8-bis(n-propylamino)-1-azaanthraquinone ____g__ | 0.3 |
| Ethanol _____g__ | 0.35 |
| Sodium N-cyclohexyl-N-palmitoyl taurate ____g__ | 1.00 |
| Hydroxyethylcellulose _____g__ | 1.5 |
| Water up to _____ml__ | 100 |
| Lactic acid to pH 5 ca. _____g__ | 0.3 |

The dyeing composition was brought into contact with human hair (natural gray and bleached) and left there for 30 minutes at 38°. The hair was dyed a greenish blue shade.

Example 12

The dyeing composition was prepared the following way:

| | |
|---|---|
| 1-bis(methylamino)-1-azaanthraquinone _____g__ | 0.25 |
| Lauric acid diethanolamide _____g__ | 3.0 |
| Ethanol _____g__ | 1.0 |
| Sodium carboxymethylcellulose _____g__ | 0.5 |
| Monoethanolamine _____g__ | 4.0 |
| Water up to _____ml__ | 100 |
| Citric acid to adjust pH 9.2. | |

The composition was poured onto natural gray and bleached hair and remained in contact for 20 minutes at 30°. The hair was dyed a level blue shade, which was somewhat stronger for bleached than for gray hair. The dyeings were fast to shampooing and perspiration. When the dyeing composition was stored at 50° C., for 3 months, it did not deteriorate as shown by a fresh dyeing which in every respect was equal to the original dyeing.

Example 13

A dyeing composition was prepared in the following manner:

| | |
|---|---|
| 5,8-diamino - 1-azaanthraquinone _____g__ | 0.25 |
| Sodium N-methyl-N-oleoyl tartrate _____g__ | 0.5 |
| Isopropanol _____g__ | 0.5 |
| Sodium carboxymethylcellulose _____g__ | 0.5 |
| Monoethanolamine _____g__ | 4.0 |
| Water up to _____ml__ | 100 |
| Lactic acid to adjust pH to 9.2. | |

This mixture was applied to natural gray and bleached hair and left in contact for 20 minutes at 38° C. The hair was dyed a strong reddish blue shade, fast to rubbing.

Example 14

| | |
|---|---|
| 5,8-bis(3-dimethylaminopropylamino)-1-azaanthraquinone _____g__ | 0.2 |
| Isopropanol _____g__ | 0.5 |
| Triisopropanolamine _____g__ | 0.25 |
| Coconut acid diethanolamide _____g__ | 2.0 |
| Coconut acid ethanolamide _____g__ | 4.0 |
| Coco amine crotonic acid condensate _____g__ | 3.0 |
| Water up to _____ml__ | 100 |
| Lactic acid to pH 7.5. | |

The composition was poured on natural gray and bleached hair and maintained in contact with the hair for 20 minutes at 38° C. After rinsing with water the hair was found to be dyed a greenish blue shade, the bleached hair being dyed somewhat stronger than the gray. The dyeings were fast to shampooing and perspiration.

Example 15

| | |
|---|---|
| 5,8-bis[3 - (3 - aminopropylamino)propylamino]-1-azaanthraquinone _____g__ | 0.15 |
| Isopropanol _____g__ | 0.5 |
| Nonylphenoxy(polyethyleneoxy)ethanol _____g__ | 0.5 |
| Hydroxyethylcellulose _____g__ | 0.5 |
| Diethylenetriamine _____g__ | 3.0 |
| Water up to _____ml__ | 100 |
| Citric acid to pH 8.5. | |

This mixture was applied to natural gray and bleached hair and left in contact therewith for 20 minutes at 38° C. The hair was dyed a greenish blue shade; the bleached hair somewhat stronger than the natural gray. Both dyeings were fast to washing and perspiration. And, when the dyeing composition was stored in the dark for 3 months at 50° C., and the dyeings then repeated, there was obtained the same shade and strength as in the initial dyeings.

Example 16

| | G. |
|---|---|
| 5,8-bis(ethoxyethylamino)-1-azaanthraquinone ____ | 0.25 |
| Isopropanol _____ | 0.5 |
| Diethanolamine _____ | 4.0 |
| Coconut acid diethanolamide _____ | 4.0 |
| Methylcellulose _____ | 2.0 |
| Citric acid to pH 10. | |
| Water up to 100 ml. | |

The above preparation was applied to natural gray and bleached hair and left in contact therewith for 20 minutes at 38° C. The hair was dyed a deep blue having a greenish tint. The dyeings were fast to rubbing, shampooing and perspiration.

Example 17

A swatch of cellulose acetate piece goods was dyed with 5,8-dianilino-1-azanthraquinone, using 1% of the dye (on weight of the fiber), dispersed in water with the aid of sodium lignin-sulfonate. The liquor ratio used was 40:1, and the dyeing was carried out at 50° C. for one-half hour, and then at 90° C. for one hour. The goods were dyed a green shade blue.

Example 18

Cellulose acetate was dyed with 1% (on weight of fiber) of 5,8-bis-benzylamino-1-azaanthraquinone, dispersed in water with the aid of sodium ligninsulfonate. The dyeing was carried out at a liquor ratio of 40:1, for one-half hour at 50° C., and then for one hour at 90° C. The dyeing was greenish blue.

Although the invention has been described with reference to specific forms thereof, it will be understood that many changes and modifications may be made without departing from the spirit of this invention.

What is claimed is:

1. A method for dyeing human hair on the head which comprises applying to said hair at about room temperature a tinctorially effective amount of a dye the formula:

wherein R is selected from the group consisting of hydrogen, alkyl, hydroxyalkyl, aminoalkyl, alkoxyalkyl, aryl and aralkyl; wherein the alkyl portion is lower alkyl.

2. A method according to claim 1 wherein the dye employed is such that R is lower alkyl.

3. A method according to claim 1 wherein the dye employed is such that R is lower hydroxyalkyl.

4. A method according to claim 1 wherein the dye employed is such that R is methyl.

5. A method according to claim 1 wherein the dye employed is such that R is n-propyl.

6. A method according to claim 1 wherein the dye employed is such that R is 2-hydroxyethyl.

7. A method according to claim 1 wherein the dye employed is such that R is dialkylaminoalkyl.

8. A method according to claim 1 wherein the dye employed is such that R is hydrogen.

References Cited

UNITED STATES PATENTS 2,552,263  5/1951  Dickey _____ 260—288

ALBERT T. MEYERS, *Primary Examiner.*

V. C. CLARKE, *Assistant Examiner.*

U.S. Cl. X.R.

8—10; 260—288